(12) United States Patent
Yang

(10) Patent No.: US 11,307,106 B2
(45) Date of Patent: Apr. 19, 2022

(54) TORQUE MEASUREMENT SYSTEM

(71) Applicant: City University of Hong Kong, Kowloon (HK)

(72) Inventor: Zhengbao Yang, Kowloon (HK)

(73) Assignee: City University of Hong Kong, Kowloon (HK)

( * ) Notice: Subject to any disclaimer, the term of this patent is extended or adjusted under 35 U.S.C. 154(b) by 0 days.

(21) Appl. No.: 16/420,243

(22) Filed: May 23, 2019

(65) Prior Publication Data
US 2020/0370977 A1 Nov. 26, 2020

(51) Int. Cl.
| | |
|---|---|
| *G01L 3/10* | (2006.01) |
| *G01L 25/00* | (2006.01) |
| *H02K 11/24* | (2016.01) |
| *H02J 50/00* | (2016.01) |
| *G01L 3/02* | (2006.01) |
| *H02J 50/12* | (2016.01) |
| *G01L 3/04* | (2006.01) |
| *H02J 50/10* | (2016.01) |

(52) U.S. Cl.
CPC .............. *G01L 3/101* (2013.01); *G01L 3/108* (2013.01); *G01L 3/02* (2013.01); *G01L 3/04* (2013.01); *G01L 25/003* (2013.01); *H02J 50/001* (2020.01); *H02J 50/10* (2016.02); *H02J 50/12* (2016.02); *H02K 11/24* (2016.01)

(58) Field of Classification Search
CPC ........ H02K 11/24; H02J 50/001; H02J 50/10; H02J 50/12; G01L 3/108; G01L 3/00; G01L 3/02; G01L 3/04; G01L 25/003
See application file for complete search history.

(56) References Cited

U.S. PATENT DOCUMENTS

| | | | | |
|---|---|---|---|---|
| 4,697,460 A | * | 10/1987 | Sugiyama | G01L 3/1435 324/209 |
| 6,269,702 B1 | * | 8/2001 | Lambson | G01L 3/108 73/862.045 |
| 7,095,198 B1 | * | 8/2006 | O'Brien | G01L 3/242 318/432 |
| 8,495,263 B2 | * | 7/2013 | Harish | G05B 19/0423 710/63 |
| 2005/0017602 A1 | * | 1/2005 | Arms | B60C 23/0413 310/339 |
| 2005/0156590 A1 | * | 7/2005 | Nagae | G08C 17/00 324/167 |
| 2006/0037410 A1 | * | 2/2006 | Gierut | G01L 3/101 73/862.335 |

(Continued)

FOREIGN PATENT DOCUMENTS

WO WO-2017165448 A1 * 9/2017 .............. G01L 3/24

*Primary Examiner* — Jonathan M Dunlap
(74) *Attorney, Agent, or Firm* — Renner Kenner Greive Bobak Taylor & Weber

(57) ABSTRACT

A system and a method for a torque measurement system for a vehicle having a rotatable member connecting an engine to a torque converter and rotatable about a rotating axis, the torque measurement system including a strain measuring module arranged to measure the strain on the rotatable member; a control module arranged to process the data associated with the strain measurement; and an energy generating module arranged to generate electricity through the movement of the rotatable member, thereby powering the torque measurement system.

37 Claims, 7 Drawing Sheets

(56) References Cited

U.S. PATENT DOCUMENTS

| | | | | |
|---|---|---|---|---|
| 2006/0284583 | A1* | 12/2006 | Andrews | G01L 25/003 |
| | | | | 318/432 |
| 2007/0220960 | A1* | 9/2007 | JaVaherian | G01L 3/1428 |
| | | | | 73/114.15 |
| 2009/0314104 | A1* | 12/2009 | Lohr | G01L 3/1428 |
| | | | | 73/862.338 |
| 2010/0031756 | A1* | 2/2010 | Mian | G01L 3/104 |
| | | | | 73/862.335 |
| 2011/0138933 | A1* | 6/2011 | Ramsesh | G01L 3/108 |
| | | | | 73/862.333 |
| 2014/0000386 | A1* | 1/2014 | Malhan | G01L 3/108 |
| | | | | 73/862.338 |
| 2014/0195103 | A1* | 7/2014 | Nassef | G01L 5/0095 |
| | | | | 701/31.5 |
| 2015/0330851 | A1* | 11/2015 | Beligere | H04B 5/0031 |
| | | | | 73/862.338 |
| 2016/0049826 | A1* | 2/2016 | Lee | H02J 50/80 |
| | | | | 320/108 |
| 2017/0093215 | A1* | 3/2017 | Ng | H01F 7/021 |
| 2018/0178778 | A1* | 6/2018 | Lahr | F16H 45/02 |
| 2018/0292276 | A1* | 10/2018 | Chen | H05K 1/181 |
| 2019/0099119 | A1* | 4/2019 | Wakeham | A61B 5/221 |
| 2019/0238043 | A1* | 8/2019 | Kao | B64C 3/56 |
| 2020/0144893 | A1* | 5/2020 | Saavedra | B60L 50/60 |
| 2020/0370977 | A1* | 11/2020 | Yang | G01L 3/108 |

* cited by examiner

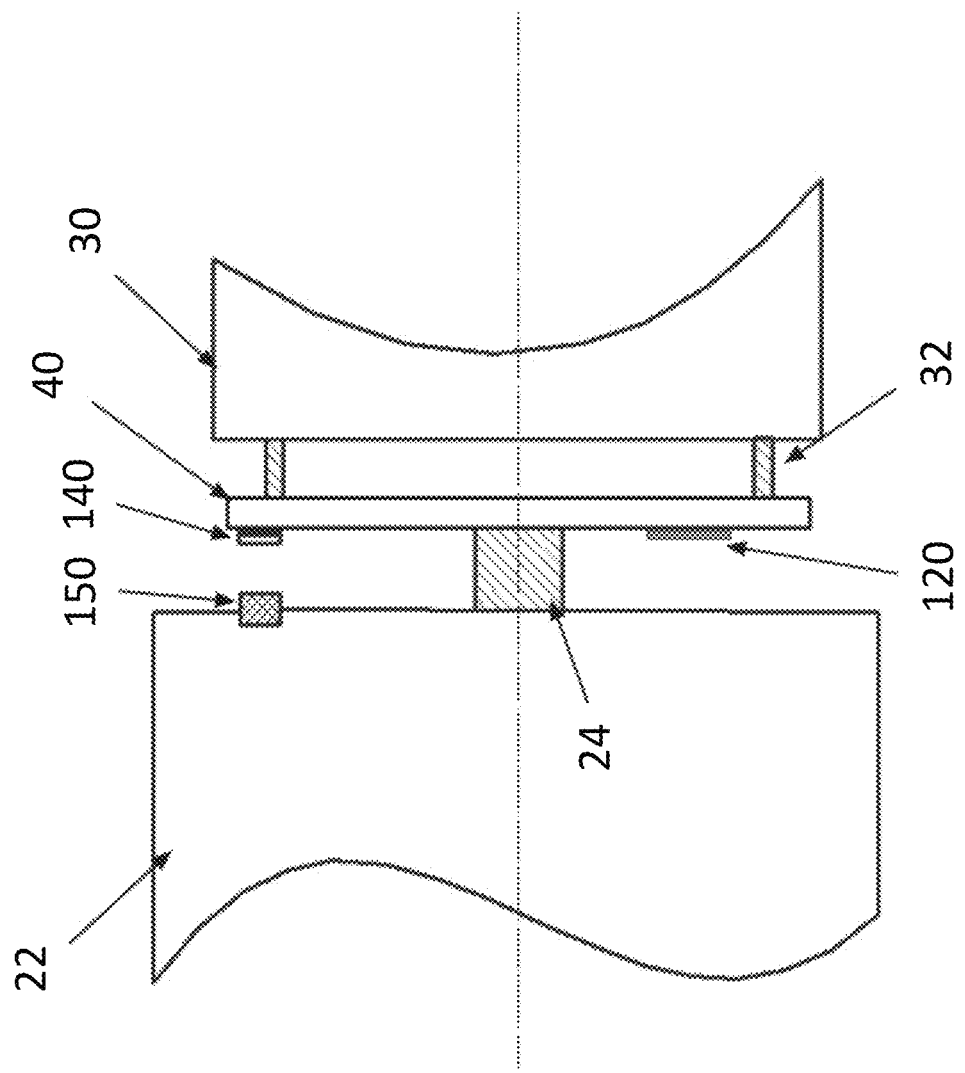

TORQUE MEASUREMENT SYSTEM

FIELD OF INVENTION

The present invention relates to a torque measurement system, and more particularly, to a self-powered torque measurement system for use in automotive industry.

BACKGROUND

Horsepower and torque are the two main criteria for assessing the characteristic of an engine. In general, horsepower is a parameter for measuring the total power output of an engine, while torque is a parameter for measuring the turning or torquing ability of the engine. Although horsepower may measure the top speed of an automotive, torque is usually a better measurement of how rapidly a vehicle may respond to the pressing of pedal by the driver and how the torque variation is on different road and load conditions.

SUMMARY OF INVENTION

In accordance with a first aspect of the present invention, there is provided a torque measurement system for a vehicle having a rotatable member connecting an engine to a torque converter and rotatable about a rotating axis, the torque measurement system comprising:
- a strain measuring module arranged to measure the strain on the rotatable member;
- a control module arranged to process the data associated with the strain measurement; and
- an energy generating module arranged to generate electricity through the movement of the rotatable member, thereby powering the torque measurement system.

In an embodiment of the first aspect, the energy generating module is arranged to generate electricity through the relative movement between the engine and the rotatable member or the torque converter.

In an embodiment of the first aspect, the energy generating module includes a pair of magnetic elements, one of which being mounted on the rotatable member and the other of which being mounted on one of the engine and the transmission.

In an embodiment of the first aspect, the energy generating module includes first and second magnetic elements, one of which with coils being mounted on the rotatable member and the other of which with magnets being mounted on the engine or the transmission.

In an embodiment of the first aspect, the first magnetic element includes a coil and core assembly.

In an embodiment of the first aspect, the second magnetic element includes a magnetic array formed by a plurality of magnets.

In an embodiment of the first aspect, the two adjacent magnets are provided with opposite polarity.

In an embodiment of the first aspect, the magnetic array is provided in a Halbach-array pattern.

In an embodiment of the first aspect, each magnet of the magnetic array is spaced between each other.

In an embodiment of the first aspect, the magnetic elements are provided offset from the rotating axis.

In an embodiment of the first aspect, the energy generating module is arranged to generate current from the relative motion between the rotatable member and static magnet.

In an embodiment of the first aspect, the energy generating module includes piezoelectric patches, attached on the rotational parts.

In an embodiment of the first aspect, the piezoelectric patches are arranged to generate current from the deformation of the rotatable members.

In an embodiment of the first aspect, the energy generating module is oriented at an inclined angle from the circumferential direction of the rotatable member.

In an embodiment of the first aspect, the torque measurement system further includes a wireless transmitting module for communicating the processed data with an external wireless receiving module.

In an embodiment of the first aspect, the torque measurement system further includes an additional sensor for monitoring additional condition of the vehicle.

In an embodiment of the first aspect, the vehicle is an auto transmission vehicle and the rotatable member is a flexplate.

In an embodiment of the first aspect, the vehicle is a manual transmission vehicle and the rotatable member is a flywheel.

In an embodiment of the first aspect, the energy generating module is arranged to generate electricity through the deformation of the rotatable member or the torque converter.

In an embodiment of the first aspect, the energy generating module includes one or more piezoelectric patches, one or more of which being mounted on the rotatable member.

BRIEF DESCRIPTION OF DRAWINGS

Embodiments of the present invention will now be described, by way of example, with reference to the accompanying drawings in which:

FIG. 3 is a sectional simplified sketch of the preferred embodiment within the flexplate assembly;

DETAILED DESCRIPTION

Figure 1:
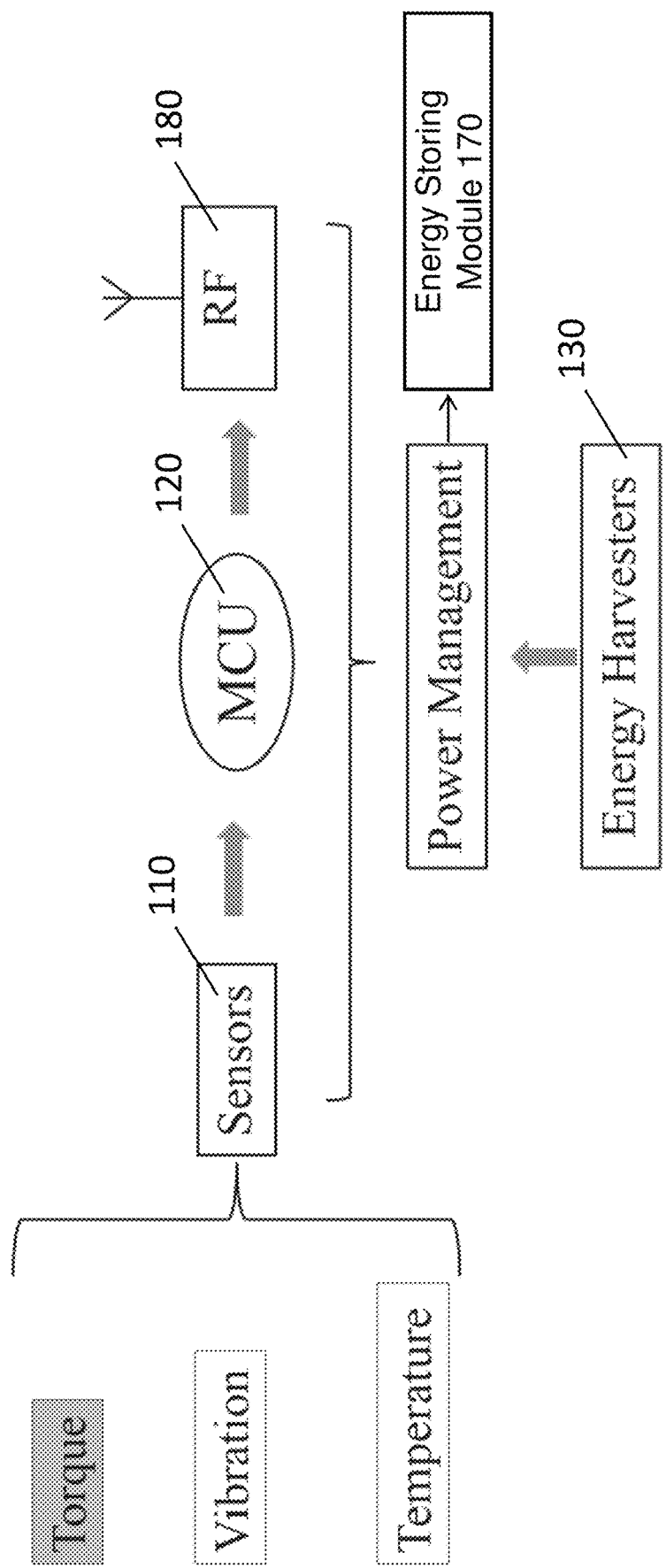
FIG. 1 is a schematic diagram of the torque measurement system in one embodiment of the invention.

Torque and speed are the two most important quantities transmitted in vehicles. While speed has been well measured for a long time, there is few effective ways to monitor torque currently in the market. Most vehicles operate based on engine torque estimation methods which are usually inaccurate and unreliable.

With the rapid development of electric cars, intelligent vehicles and self-driving techniques, the need for an accurate and effective long-term torque measurement system becomes more and more pressing. Thus, it is of high importance to fill the gap between the current rough torque estimation method and the urgent requirement of accurate torque measurement.

The present invention seeks to provide a new or otherwise improved torque measurement system which may measure the torque directly for effective control of engines and for optimal torque distributions.

In a typical transmission assembly of a vehicle 10, there is an engine 20 for starting a vehicle 10, a torque converter 30 such as a gearbox for step up or step down the speed of the vehicle 10, and a rotatable member 40 e.g. a flexplate or a flywheel for connecting the engine 20 to the torque converter 30 thereby transmitting the rotational force therebetween.

Referring to FIGS. 1 to 5, there is provided a torque measurement system 100 for an vehicle, having a rotatable member 40, e.g., a spinning plate connecting an engine 20 to a torque converter 30 and rotatable about a rotating axis 24, the torque measurement system 100 comprising: a strain measuring module 112 arranged to measure the strain on the rotatable member 40; a control module 120 arranged to process the data associated with the strain measurement, and an energy generating module 130 arranged to generate electricity through the movement of the rotatable member 40, thereby powering the torque measurement system 100.

The overall layout of the torque measurement system 100 is depicted in FIG. 1. Essentially, the system 100 includes a sensor module 110, a control module 120, and an energy generating module 130. These essential modules are arranged in the form of a power management circuit.

In one preferred embodiment, the vehicle 10 may be an auto transmission vehicle having an engine 20 and a torque converter 30. The rotatable member 40 may be incorporated as a flexplate made of metal disk. One end of the flexplate 40 is connected with the engine 20.

The other end of the flexplate 40 is connected with a torque converter 30. A significant amount of torque and vibration is generated during the rotation of the flexplate 40.

The torque measurement system 100 may be incorporated as part of the transmission assembly for instance, installed within the flexplate assembly in a powertrain. Preferably, the system 100 is installed on the flexplate 40 between the engine 20 and the torque converter 30.

Essentially, the sensor module 110 includes a strain measuring module 112 for measuring the strain e.g. principal strains due to shear on the flexplate 40. The control module 120 is connected to the strain measuring module 112 for processing the strain measurement reading.

In one example configuration, the strain measuring module 110 may include a set of strain gauges 112 on the surface of the flexplate 40. The number of strain gauges 112 may be one, two or multiple, which is determined based on the required accuracy, external disturbance compensation and cost.

The principal strains are equal in tension and compression. Thus, it is preferable to orient the strain gauges 112 at +/−45 degree to the circumferential direction in the flexplate 40. Preferably, the strain gauges 112 are arranged in a symmetric layout and full-bridge configuration to compensate zero drift, temperature drift, axial displacement and misalignment effect.

High impedance and large gauge factor i.e. high ratio of relative change in electrical resistance R to the mechanical strain c are preferred to reduce power consumption. Preferably, the strain gauge 112 may be made of metal foil or semiconductor materials i.e. piezoresistive strain gauges.

The sensor module 110 is in signal communication with the control module 120. The control module 120 may be incorporated as a microcontroller such as low-power MCU, ultra-low-power MCU and auxiliary components e.g. ADC, noise filter, amplification circuit, power management circuit, battery charging/protection circuit, RF control circuit, bridge.

On one hand, the control module 120 acquires and processes the raw data from strain gauges 112. On the other hand, the control module 120 regulates the power from the energy generating module 130. More preferably, the control module 120 may manipulate the system 100 between an operating mode and a sleep mode. For instance, if no reading is received from the sensor modules 110 for a predetermined period, that is, the engine 20 stops operating, the system 100 may be switched to sleep mode to save energy.

To provide power supply to the torque measurement system 100, there is also provided an energy generating module 130 for generate electricity through the movement of the flexplate 40. The energy generating module 130 converts the mechanical energy associated with the spinning of the flexplate 40 to electrical energy and serves as the power source for the whole system 100.

The energy harvesting function of the energy generating module 130 may be achieved by various embodiments such as electromagnetic or piezoelectric method. The number of energy generating module 130 may be one, two or multiple, dependent on the overall power requirements of the system 100, cost and work conditions.

The electrical energy generated by the energy generating module 130 may be rectified and subsequently stored for usage. To store the electrical energy generated by the electromagnetic and/or piezoelectric energy harvesters 130, after rectification, there is also provided an energy storing module 170, e.g., one or more light-weight super capacitors or rechargeable batteries or combined for storing the energy locally.

Optionally, energy boosting circuit topologies such as Synchronized Switch Harvesting on Inductor (SSHI) e.g. Self-powered electronic breaker with automatic switching by detecting maxima or minima of potential difference between its power electrodes may be embedded into the power management circuit to improve the energy transfer efficiency.

The control module 120 may be connected to external devices. Preferably, there is provided a wireless communication module 180 e.g. a radio frequency (RF) communication module for communicating the torque measurement system 100 with one or more external receivers, thereby wirelessly transmitting the processed data, e.g. torque information or readings collected by the sensor modules 110 to the external devices via the RF module 180. The RF communication is controlled by the control module 120. Preferably, the wireless communication module 180 may be any RF protocol, such as Bluetooth, Zigbee or RF 315 MHz, which selection should consider the requirements of specific vehicles 10.

Figure 2:
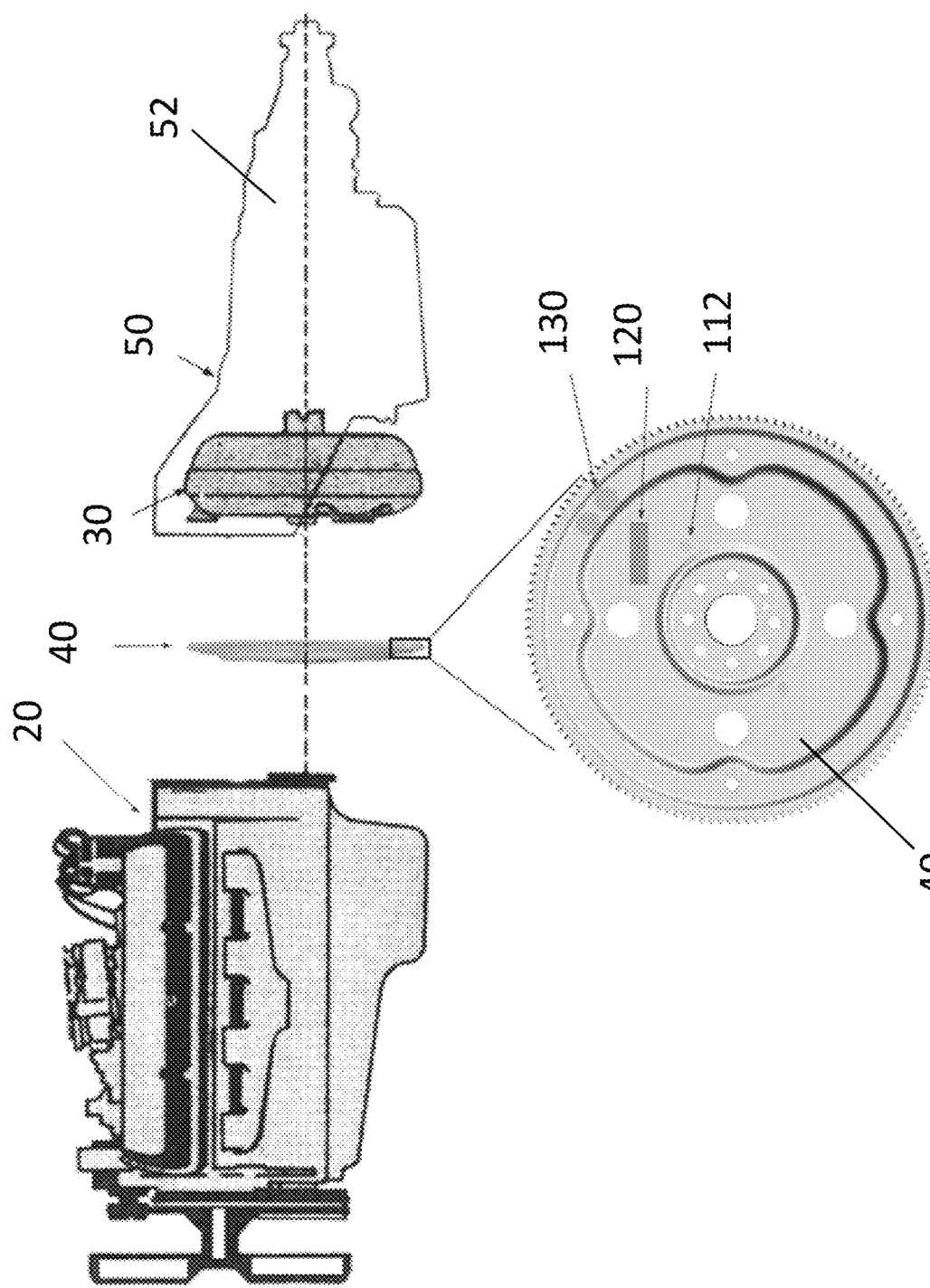
FIG. 2 is an exploded perspective view of the torque measurement system incorporated to a conventional engine and transmission assembly.

Referring to FIGS. 2 to 3 for a preferred embodiment of the flexplate assembly 100 using the electromagnetic energy harvesting method. The flexplate 40 provides the means to transmit torque from a starter to the engine 20 through the outside gear and in turn transmits torque from the engine 20 to transmission 50. Meanwhile, the flexplate 40 may absorb any axial force and vibrations between engine 20 and transmission 50.

Turning now to the detailed configuration of this embodiment, the flexplate 40 is bolted to the engine crank shaft 24 of the engine 20 near its centre, such that the flexplate 40 may be coaxial with the engine crank shaft 24. The flexplate 40 is also connected to the torque converter 30 via bolts 32. The gap between the housing case 22 of the engine 20 and flexplate 40 and the gap between the flexplate 40 and the front end of the torque converter 30 are very small.

In this electromagnetic method, the energy generating module 130 includes a set of coil and core assembly 140 and a set of corresponding magnets 150. The coil and core assembly 140 may be made of cores 142 about which a plurality of coils 144 is surrounded. The coil and core assembly 140 is mounted on the rotating flexplate 40. The coil and core assembly 140 and the rotating flexplate 40 are concentrically aligned and both parallel to the engine shaft 24.

A set of coils 144 is fixed on a flexplate 40 and rotatable with the flexplate 40. A set of corresponding magnets 150 may be mounted on a fixed component and for instance either on the stationary engine case 22 or the transmission case 52. Due to the relative movement between the flexplate 40 and the engine case 22 or the transmission case 52, a current is induced, following the Faraday's law of induction. Once the flexplate 40 spins, the relative motion between the coil 144 and the magnet 150 generates electrical power.

Preferably, flat coils 144 and ferrite cores 142 are used to reduce the overall volume and strengthen the magnetic field. The number of magnets 150 and coils 144 is decided by the power requirement of the torque measurement system. If the power consumption of the system is high, the required number of magnets 150 and coils 144 will be increased. The number of magnets 150 and coils 144 is also determined by the available space of the flexplate assembly, weight and cost.

Preferably, the system 100 may include more than one magnets 150 and coils 144. In this situation, the polarity of the magnet 150 array and the connection of the coils 144 is arranged in a particular configuration.

Figure 4A:
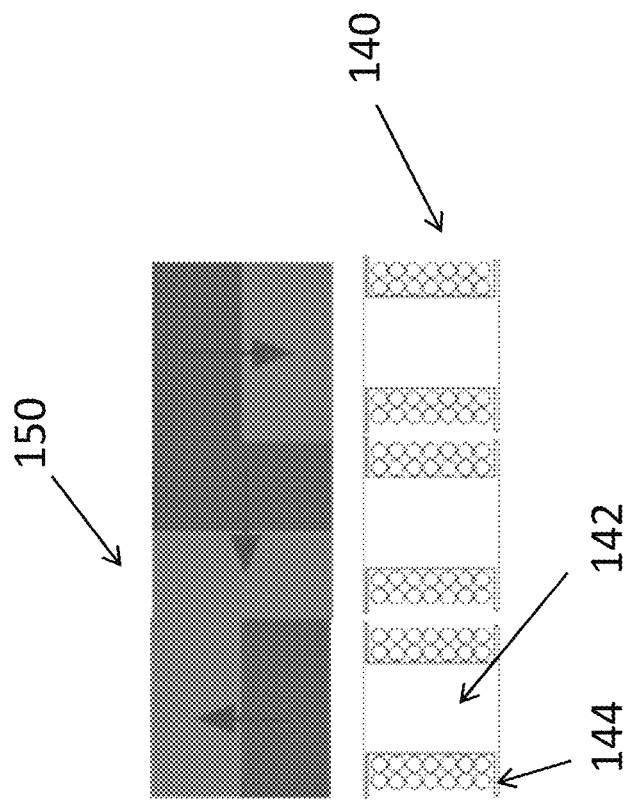
FIG. 4A is schematic diagram showing the coil and magnet arrangement of one example embodiment.

As shown in FIG. 4A, the magnets 150 may be arranged side by side closely without any gaps. In this situation, the polarity of one magnet 150 should be different from the adjacent. For instance, the first magnet 150 may have a polarity of N-S and the adjacent second magnet 150 may have an opposite polarity of S-N.

Figure 4B:
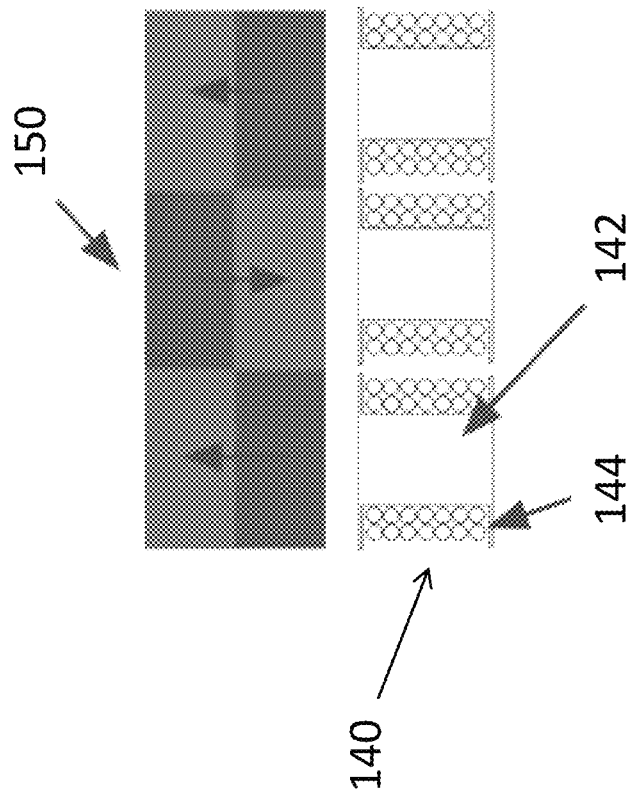
FIG. 4B is schematic diagram showing the coil and magnet arrangement of another example embodiment.

In one alternative embodiment as shown in FIG. 4B, the magnets 150 may be arranged in a Halbach-array pattern for providing a one-side flux structure. In this structure, the magnetic array may have two sides, one side with a stronger magnetic field and the other side with a weaker magnetic field i.e. near zero.

Optionally, the magnets 150 may also be arranged not side by side, with a gap between each other. In this situation, the polarity sequence of the magnets 150 has little impact on each other and their arrangement can be same or different.

In one example embodiment, a plurality of coils 144 is used. The coils 144 may be connected in parallel or in series. When connecting the coils 144, one should consider the polarity of the magnet 150 array to avoid any counteraction of induced current. Alternatively, the coils 144 could also stay independent, connecting with an independent rectifying circuit.

The position of coil and core assembly 140 and magnets 150 are preferred to be set away from the rotating center to gain high relative velocity. The coil and core assembly 140 could also be arranged symmetrical relative to the rotating center of flexplate 40 to compensate the dynamic imbalance effect.

Figure 5:
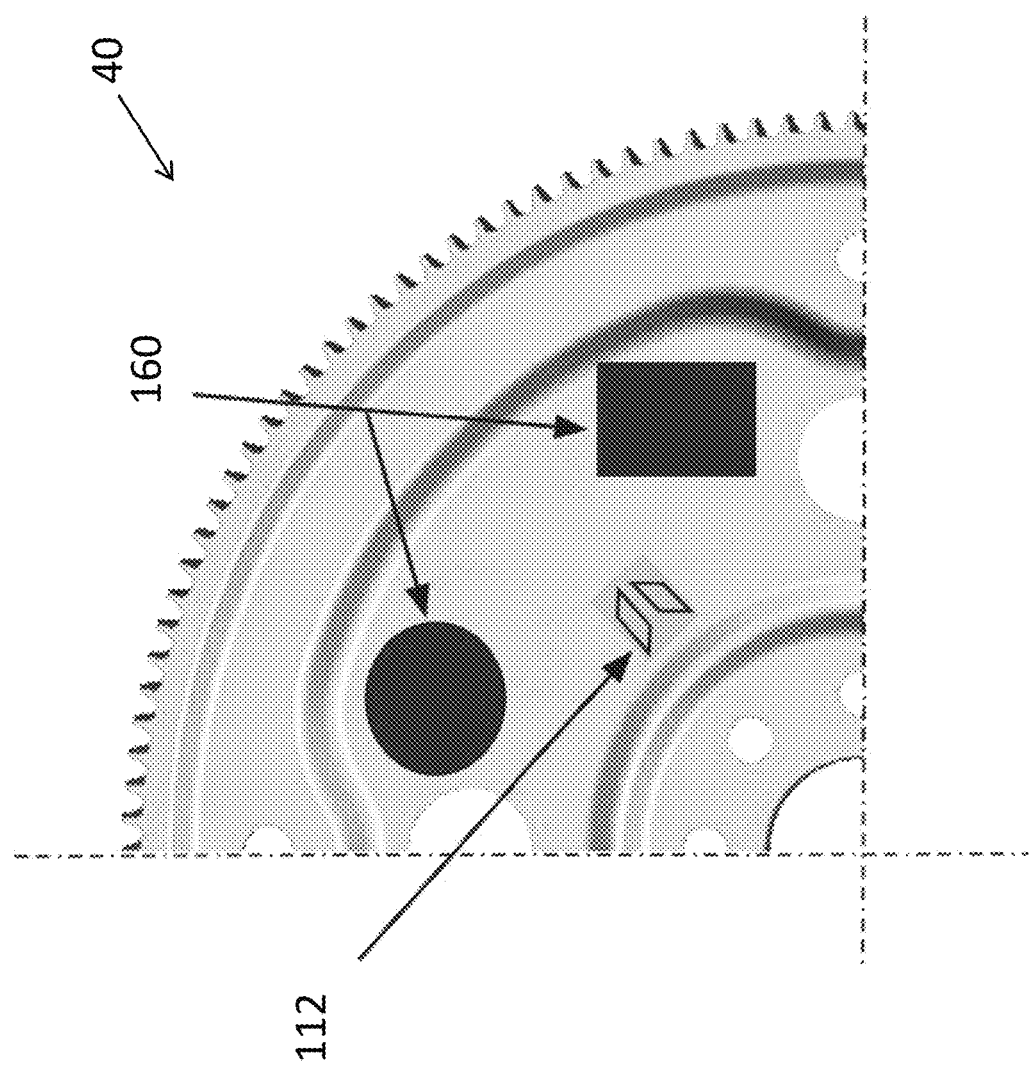
FIG. 5 is an enlarged fragmentary view of strain gauges and piezoelectric patches on a flexplate.

Referring to FIG. 5 for an alternative embodiment of the flexplate assembly 100 using the piezoelectric energy harvesting method. One quarter of an enlarged flexplate 40 is shown in FIG. 5. In this configuration, there is provided a plurality of strain gauges 112 and an energy generating module 130 on the flexplate 40. The energy generating module 130 includes one or more piezoelectric patches 160 preferably made of piezoceramics (e.g., PZT), single crystal materials (e.g., PMN-PT) piezo polymers (e.g., PVDF), or any materials that show high piezoelectric effect. The piezoelectric patches 160 may also be provided in a form of single layer, multiple-layer stack, fibre or composite.

In this embodiment, one or more of the piezoelectric patches 160 may be firmly attached or mounted on the surface of the flexplate 40. During operation, the flexplate 40 deforms frequently to counteract the axial displacement from the torque converter 30 and the misalignment between the engine shaft 24 and the shaft of the torque converter 30. The mechanical energy contributed by the deformation of the flexplate 40 is captured and converted to electricity by the piezoelectric patches 160. Finally, the harvested power is treated and stored in light-weight supercapacitors or rechargeable batteries 170. Alternatively, the mechanical energy may be contributed by the deformation of the torque converter 30 instead, which is then captured and converted to electricity by the piezoelectric patches 160 in a similar manner.

Preferably, a plurality of piezoelectric patches 160 may be used to capture more deformation energy within a predetermined period. As the strain condition at different spots of the flexplate 40 is unpredictable, the piezoelectric patches 160 ought to be individually connected to rectification circuits. The piezoelectric patches 160 may be provided with different geometry to fit in the flexplate 40.

Preferably, the sensor module 110 may also include or integrally formed with an accelerometer or a temperature sensor for monitoring multiple conditions in the powertrain. The torque, as well as the vibration and temperature at the flexplate 40 may be monitored and the readings may be transmitted to the control module 120 and exported to the external devices through the RF communication module 180.

In one example embodiment, there is provided a torque measurement system 100 using the method as depicted in FIGS. 2 to 3. The strain gauges 112 are each made of 5 K Ohm half-bridge shear-mode metal foil gauges and has a gauge factor of 2. The flexplate 40 has a dimension of diameter 344 mm and a thickness 9 mm. The coils 144 are each made of copper e.g. AWG 36 and includes 500 turns. The cores 142 are each made of ferrite rings. The magnets 150 are each made of Neodymium (N35 NdFeB) and has a diameter 0.5 inch and a thickness 0.25 inch.

Figure 6:
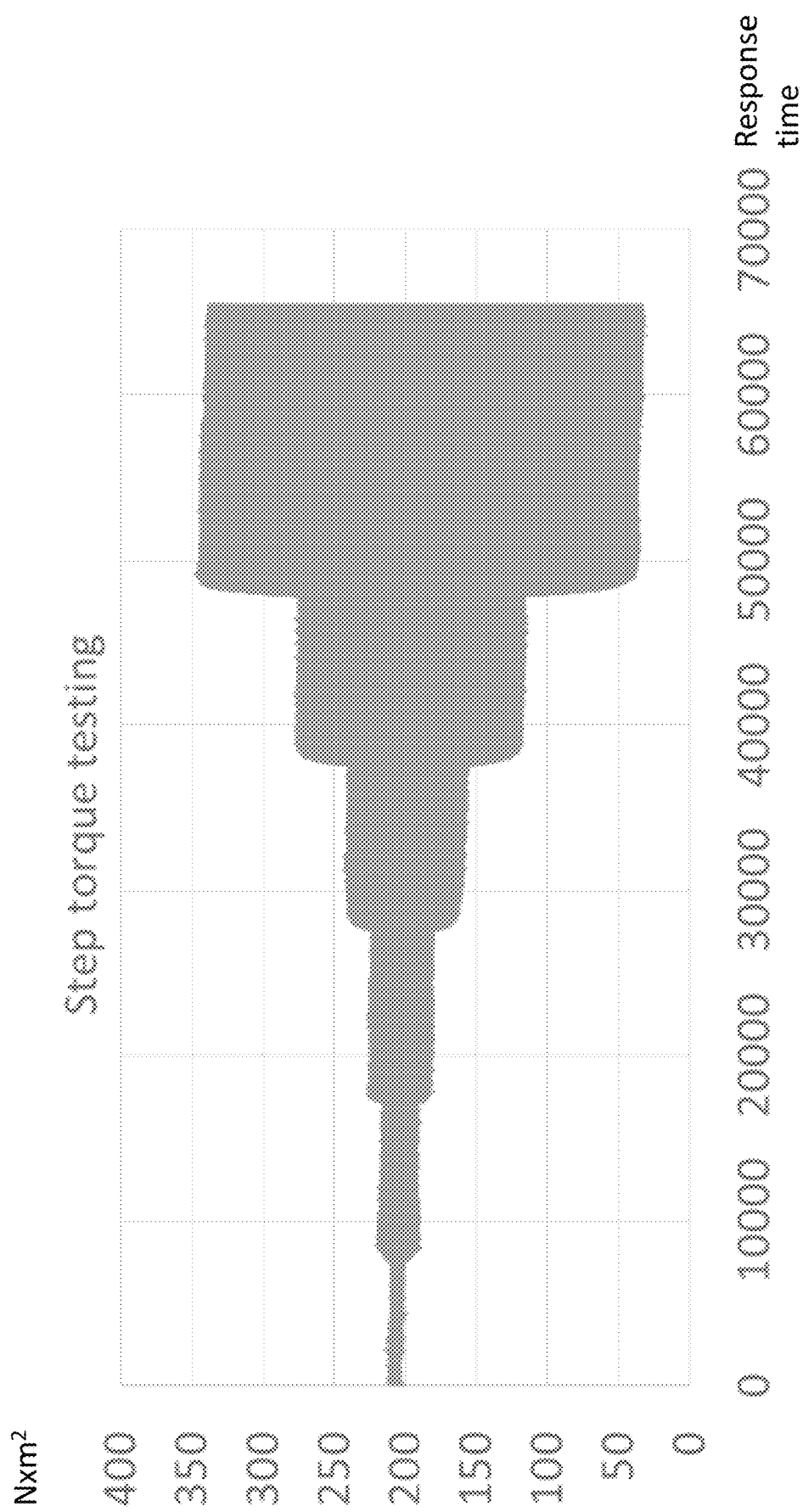
FIG. 6 is a time response graph of an exemplary prototype of the torque measurement system, particularly illustrating the linear relationship between the sensor readout and the applied torque load.

FIG. 6 shows response of the torque measurement system 100 under pure torque excitations. The torque load is in a square wave format, added step by step, 100-200-400-1600-3200 N×m$^2$. The test indicates that the system 100 can quickly and accurately responds to torque loads, and the torque response is linear with the applied torque load.

Figure 7:
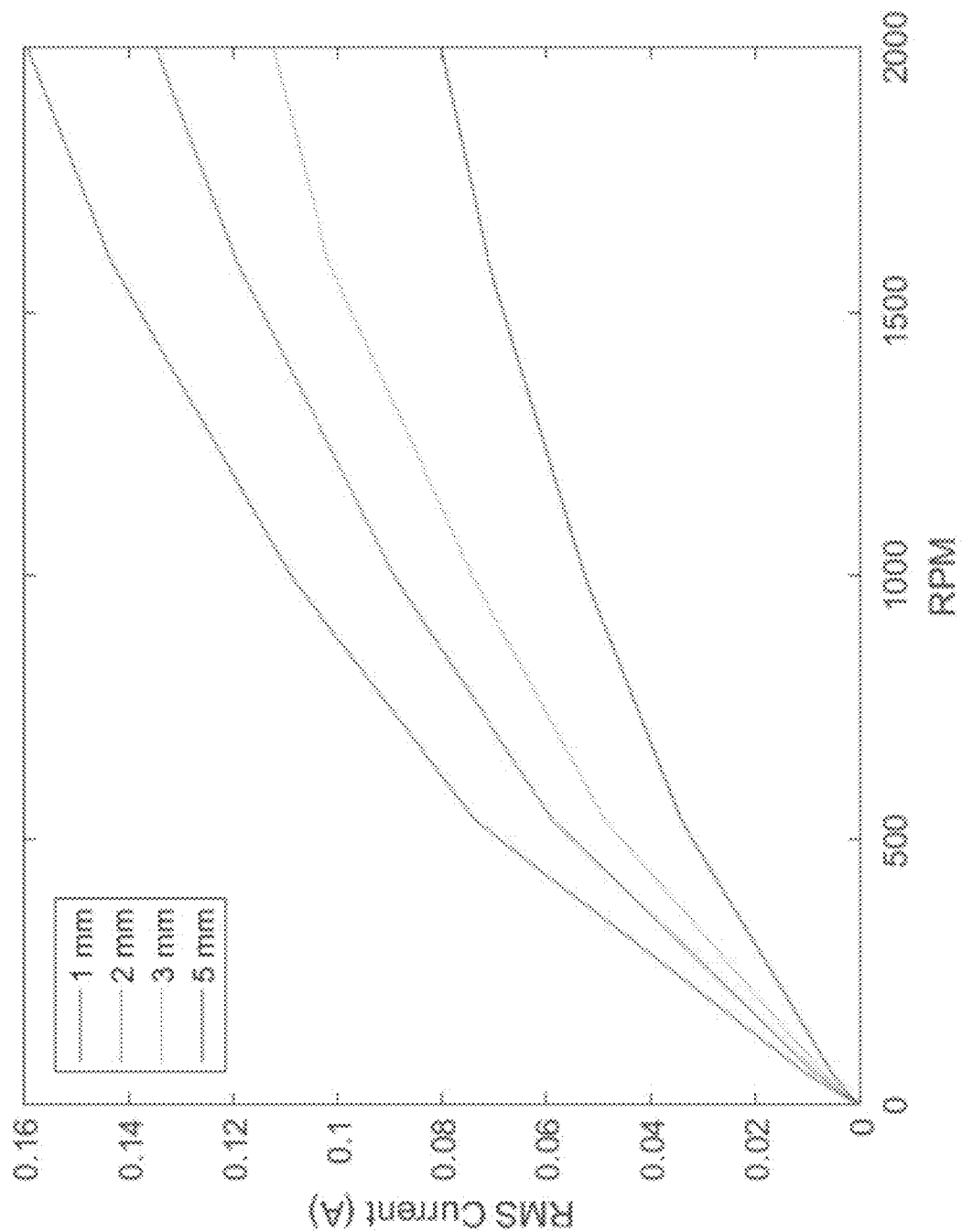
FIG. 7 is a line graph of an exemplary prototype of the system, particularly indicating the power generation capability of the electromagnetic energy harvesting method.

In one example embodiment, there is provided a torque measurement system 100 having an electromagnetic energy harvester 130 formed by one magnet 150 and one coil 144. FIG. 7 illustrates the closed-circuit current generated from the electromagnetic energy harvester 130. In this electromagnetic energy harvester 130, the magnet 150 and the coil 144 are spaced apart from each other for a predetermine distance. The rotating speed is increased from 0 to 2000 rotation per minute (RPM). The gap between the magnet 150 and the coil 144 is adjusted from 1 mm to 5 mm. A stable current ranged from about 50 mA to 140 mA is generated by the electromagnetic energy harvester 130 in the regular engine speed range of 500 to 2000 RPM, which is sufficient to self-power the torque measurement system 100 without the power supply of other external energy source.

The particular values and configurations discussed in these non-limiting examples can be varied and are cited merely to illustrate one or more embodiments and are not intended to limit the scope thereof.

The preferred embodiments described above are referring to automatic transmission systems. The invention can also be applied in conventional manual transmission systems where the role of flexplates 40 is substituted by flywheels.

Advantageously, the present invention is a torque monitoring system adapted for automotive powertrain which may be applied in various applications such as automotive industry and particularly in intelligent cars and self-driving technology. This invention could be used not only in combustion engine vehicles, but also in hybrid vehicles and electric vehicles. With minor modifications, the present invention may also be applied to various applications with rotating shafts and plates or other rotary components.

Advantageously, the entire torque measurement system 100 is self-powered where the energy harvester 130 captures rotation, vibration and deformation energy and converts it to electricity. The energy conversion is achieved by the electromagnetic effect and/or piezoelectric effect and stored locally in the battery 170. No extra power source is required.

Advantageously, the present invention provides a small size, light weight, long lifespan, and low cost torque measurement system. The torque measurement system 100 has a much smaller volume and lighter weight compared with the flexplate 40. The present torque measurement system 100 works like a bandage on the flexplate 40 and neither introduces any substantial effect on the static and dynamic responses of the flexplate 40 i.e. otherwise neglectable nor change the existing structure. To further eliminate the imbalance issue, a dynamic balancing may be performed before the installation of the torque measurement system 100 onto the flexplate 40.

The present invention provides a cost-effective, easy-to-install, and reliable torque monitoring system, which addresses the issues existing in current torque sensors. Furthermore, the system is wireless, self-powered and capable of operating automatically for an ultra-long time and providing accurate torque measurement. The present invention presents an autonomous torque monitoring system that helps to enhance fuel economy, drivability, shift quality, and combustion optimization.

It will be appreciated by persons skilled in the art that numerous variations and/or modifications may be made to the present invention as shown in the specific embodiments without departing from the spirit or scope of the invention as broadly described. The present embodiments are, therefore, to be considered in all respects as illustrative and not restrictive.

It will also be appreciated by persons skilled in the art that the present invention may also include further additional modifications made to the torque measurement system which does not affect the overall functioning of the torque measurement system.

Any reference to prior art contained herein is not to be taken as an admission that the information is common general knowledge, unless otherwise indicated. It is to be understood that, if any prior art information is referred to herein, such reference does not constitute an admission that the information forms a part of the common general knowledge in the art, any other country.

The invention claimed is:

1. A torque measurement system for a vehicle having a rotatable member connecting an engine to a torque converter and rotatable about a rotating axis, the torque measurement system comprising:
a strain measuring module arranged to measure a strain on the rotatable member;
a control module arranged to process the data associated with the measured strain; and
an energy generating module arranged to generate electricity through the relative movement between the engine and the rotatable member or the torque converter, thereby powering the torque measurement system, wherein the energy generation module is arranged to generate a current from a deformation of the rotatable member.

2. A torque measurement system in accordance with claim 1, wherein the energy generating module includes a pair of magnetic elements, one of which being mounted on the rotatable member and the other of which being mounted on one of the engine and a transmission.

3. A torque measurement system in accordance with claim 2, wherein the energy generating module includes first and second magnetic elements, one of which being mounted on the rotatable member and the other of which being mounted on the engine or the transmission.

4. A torque measurement system in accordance with claim 3, wherein the first magnetic element includes a coil and core assembly.

5. A torque measurement system in accordance with claim 3, wherein the second magnetic element includes a magnetic array formed by a plurality of magnets.

6. A torque measurement system in accordance with claim 5, wherein two adjacent magnets of the plurality of magnets are provided with opposite polarity.

7. A torque measurement system in accordance with claim 5, wherein the magnetic array is provided in a Halbach-array pattern.

8. A torque measurement system in accordance with claim 5, wherein each magnet of the magnetic array is spaced between each other.

9. A torque measurement system in accordance with claim 2, wherein the pair of magnetic elements is provided offset from the rotating axis.

10. A torque measurement system in accordance with claim 1, further including a wireless transmitting module for communicating the processed data associated with the measured strain with an external wireless receiving module.

11. A torque measurement system in accordance with claim 1, wherein the vehicle is an auto transmission vehicle and the rotatable member is a flexplate.

12. A torque measurement system in accordance with claim 1, wherein the vehicle is a manual transmission vehicle and the rotatable member is a flywheel.

13. A torque measurement system for a vehicle having a rotatable member connecting an engine to a torque converter and rotatable about a rotating axis, the torque measurement system comprising:
a strain measuring module arranged to measure a strain on the rotatable member;
a control module arranged to process the data associated with the measured strain; and
an energy generating module is arranged to generate electricity through deformation of the rotatable member or the torque converter, thereby powering the torque measurement system.

14. A torque measurement system for a vehicle having a rotatable member connecting an engine to a torque converter and rotatable about a rotating axis, the torque measurement system comprising:
- a strain measuring module arranged to measure a strain on the rotatable member;
- a control module arranged to process the data associated with the measured strain; and
- an energy generating module arranged to generate electricity through the relative movement between the engine and the rotatable member or the torque converter, thereby powering the torque measurement system, wherein the energy generating module is oriented at an inclined angle from a circumferential direction of the rotatable member.

15. A torque measurement system in accordance with claim 14, wherein the energy generating module includes a pair of magnetic elements, one of which being mounted on the rotatable member and the other of which being mounted on one of the engine and a transmission.

16. A torque measurement system in accordance with claim 15, wherein the energy generating module includes first and second magnetic elements, one of which being mounted on the rotatable member and the other of which being mounted on the engine or the transmission.

17. A torque measurement system in accordance with claim 16, wherein the first magnetic element includes a coil and core assembly.

18. A torque measurement system in accordance with claim 16, wherein the second magnetic element includes a magnetic array formed by a plurality of magnets.

19. A torque measurement system in accordance with claim 18, wherein two adjacent magnets of the plurality of magnets are provided with opposite polarity.

20. A torque measurement system in accordance with claim 18, wherein the magnetic array is provided in a Halbach-array pattern.

21. A torque measurement system in accordance with claim 18, wherein each magnet of the magnetic array is spaced between each other.

22. A torque measurement system in accordance with claim 15, wherein the pair of magnetic elements is provided offset from the rotating axis.

23. A torque measurement system in accordance with claim 14, further including a wireless transmitting module for communicating the processed data associated with the measured strain with an external wireless receiving module.

24. A torque measurement system in accordance with claim 14, wherein the vehicle is an auto transmission vehicle and the rotatable member is a flexplate.

25. A torque measurement system in accordance with claim 14, wherein the vehicle is a manual transmission vehicle and the rotatable member is a flywheel.

26. A torque measurement system for a vehicle having a rotatable member connecting an engine to a torque converter and rotatable about a rotating axis, the torque measurement system comprising:
- a strain measuring module arranged to measure a strain on the rotatable member;
- a control module arranged to process the data associated with the measured strain; and
- an energy generating module arranged to generate electricity through the relative movement between the engine and the rotatable member or the torque converter, thereby powering the torque measurement system, wherein the energy generating module includes one or more piezoelectric patches, one or more of which being mounted on the rotatable member.

27. A torque measurement system in accordance with claim 26, wherein the energy generating module includes a pair of magnetic elements, one of which being mounted on the rotatable member and the other of which being mounted on one of the engine and a transmission.

28. A torque measurement system in accordance with claim 27, wherein the energy generating module includes first and second magnetic elements, one of which being mounted on the rotatable member and the other of which being mounted on the engine or the transmission.

29. A torque measurement system in accordance with claim 28, wherein the first magnetic element includes a coil and core assembly.

30. A torque measurement system in accordance with claim 28, wherein the second magnetic element includes a magnetic array formed by a plurality of magnets.

31. A torque measurement system in accordance with claim 30, wherein two adjacent magnets of the plurality of magnets are provided with opposite polarity.

32. A torque measurement system in accordance with claim 30, wherein the magnetic array is provided in a Halbach-array pattern.

33. A torque measurement system in accordance with claim 30, wherein each magnet of the magnetic array is spaced between each other.

34. A torque measurement system in accordance with claim 27, wherein the pair of magnetic elements is provided offset from the rotating axis.

35. A torque measurement system in accordance with claim 26, further including a wireless transmitting module for communicating the processed data associated with the measured strain with an external wireless receiving module.

36. A torque measurement system in accordance with claim 26, wherein the vehicle is an auto transmission vehicle and the rotatable member is a flexplate.

37. A torque measurement system in accordance with claim 26, wherein the vehicle is a manual transmission vehicle and the rotatable member is a flywheel.

* * * * *